(12) United States Patent
Gaber

(10) Patent No.: US 7,369,302 B2
(45) Date of Patent: May 6, 2008

(54) DAY/NIGHT WEAPON SIGHT ASSEMBLY FOR USE ON WEAPON WITHOUT CHANGE IN EYE RELIEF

(76) Inventor: Leonid Gaber, 2018 Gulfstream Way, San Leandro, CA (US) 94579

( * ) Notice: Subject to any disclaimer, the term of this patent is extended or adjusted under 35 U.S.C. 154(b) by 4 days.

(21) Appl. No.: 11/433,866

(22) Filed: May 15, 2006

(65) Prior Publication Data
US 2008/0037110 A1   Feb. 14, 2008

(51) Int. Cl.
*G02B 23/12* (2006.01)
*F41G 1/38* (2006.01)

(52) U.S. Cl. ............... 359/353; 359/399; 250/214 VT; 42/119; 42/125

(58) Field of Classification Search ........ 369/399–432, 369/808–819, 350–361; 250/214 VT; 42/119–125
See application file for complete search history.

(56) References Cited

U.S. PATENT DOCUMENTS

| | | | |
|---|---|---|---|
| 4,822,994 A | 4/1989 | Johnson | 250/214 VT |
| 4,961,278 A | 10/1990 | Johnson et al. | 42/122 |
| 5,084,780 A | 1/1992 | Phillips | 359/350 |
| 5,375,361 A * | 12/1994 | Rustick | 42/125 |
| 5,442,860 A * | 8/1995 | Palmer | 42/120 |
| 5,902,996 A | 5/1999 | Sauter | 250/214 VT |
| 5,937,562 A * | 8/1999 | Brough | 42/119 |
| 5,946,132 A | 8/1999 | Phillips | 359/351 |
| 6,131,294 A | 10/2000 | Jibiki | 42/119 |
| 6,608,298 B2 | 8/2003 | Gaber | 250/214 VT |
| 6,637,144 B2 * | 10/2003 | Nelson et al. | 42/120 |

OTHER PUBLICATIONS

.Tactic Solutions, LLC of Nevada, USA has developed a universal IIT known as Model PVS-14 Series Monoloc on the Leupold M1 Long Range Optics attachable to the rear side of a tubular sight optics (see http:monoloc.com/main.php?id_page=72).
The problems experienced by a shooter in using a rearwardly attached night scope are well described By Craig Boddington in his articles at http://www.gunsandammomag.com/gun_columns/relief_1021/.

* cited by examiner

*Primary Examiner*—Thong Q Nguyen

(57) ABSTRACT

A day/night weapon sight assembly that consists of daytime sight and a nighttime sight allows the use of both sights without change in eye relief even when the nighttime sight is attached to the rear end of the daytime sight. This is achieved by supporting the daytime sight moveably in the direction of the optical axis and by supporting the nighttime sight with the use of a plane-parallel motion mechanism that allows switching of the nighttime sight between the upper inoperative position and the operative position behind and coaxially with the daytime sight.

17 Claims, 5 Drawing Sheets

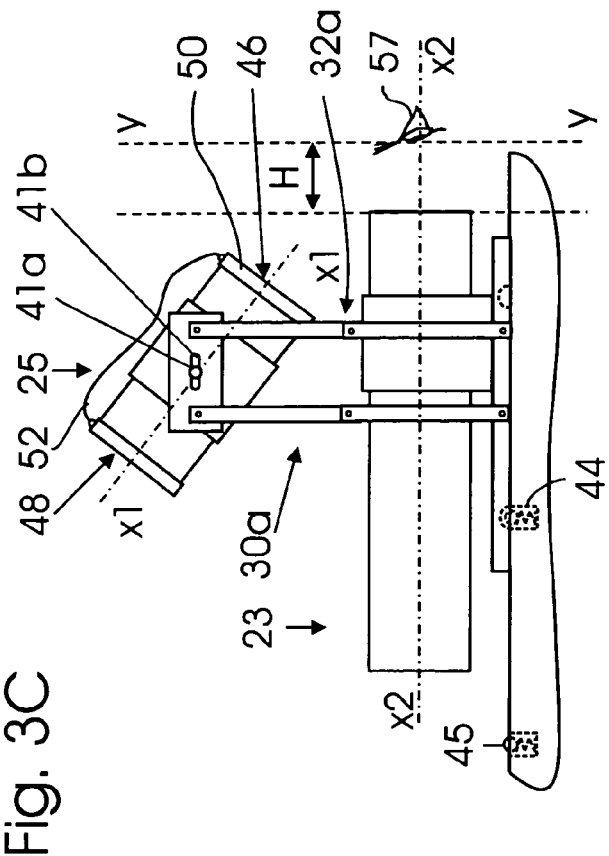
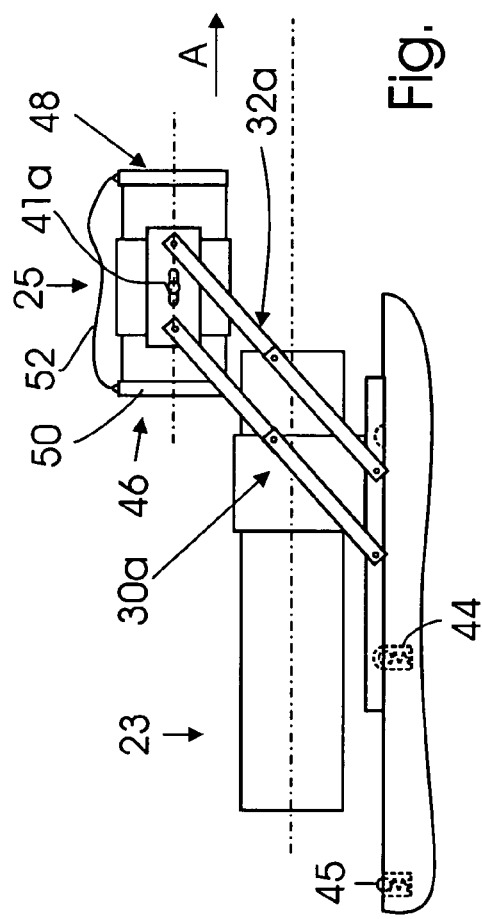

DAY/NIGHT WEAPON SIGHT ASSEMBLY
FOR USE ON WEAPON WITHOUT CHANGE
IN EYE RELIEF

FIELD OF THE INVENTION

The present invention relates to optical sights, in particular to telescopic optical sights equipped with a switchable image intensifier tube, e.g., a night-vision spotting scope, which can be switched between an inoperative position for use of the telescopic optical sight tube, alone, and an operative position in which the optical sight tube can be used in combination with the telescopic sight for enhancing operation of the latter. More specifically, the invention relates to the day/night weapon sight assembly that allows switching of the image intensifier tube to an operative position behind the main telescopic optical sight without changes in eye-relief distance.

BACKGROUND OF THE INVENTION

There exists a great variety of optical sights of different types, in particular for installation on hunting, combat, or training weapons. In general a sight is utilized for aiming a weapon during daytime operation at a directly visible target and during nighttime operation at a target, which is only visible through the use of some vision-aiding devices.

Daytime sight devices range from simple front and rear sights like those on ordinary rifles to complex optical systems in combination with laser range finders and laser aiming devices. Certain sophisticated types such as telescopes are utilized to magnify a target and to enable the user during normal daytime operation to view a magnification of the target area at which the viewer is aiming.

There are also nighttime vision devices or sights, which employ image intensifiers or similar structures. The function of an image intensifier is to multiply the amount of incident light received to produce a signal that is bright enough for presentation to the eyes of a viewer. As such, these devices have been employed by the military and in commercial products as well. Sights vary in size, magnification, type of reticle, weapon application and level of performance.

An image intensifier tube (IIT) is a vacuum photoelectronic device intended either for transformation of an invisible IR, UV, or X-ray image of an object into a visible image or for intensification of a visible image. An IIT normally consists of a photocathode, an image intensification system, and a cathode-luminescent screen. The photocathode transforms the original optical image into a so-called electronic image. With the use of the image-intensifying system, the electronic image is transferred to the screen where this image, in turn, is converted into a visible original image. In the IIT, the light reflected from the object causes emission of electrons (photocurrent) from the surface of the photocathode. In this case, a magnitude of photocurrent generated by various areas of the photocathode depends on distribution of density of images projected onto these areas. Photoelectrons accelerated and focused by the IIT's field bombard the screen, thus causing it to luminesce. Since brightness on individual areas of the screen depends on density of the photocurrent, the screen reproduces a visible image of the object.

There exists a great variety of IIT's that have different constructions, methods of attachment to the weapon, and principles of use and operation.

Since it is advantageous to use the same weapon with daytime and nighttime vision devices, many contemporary weapons are provided with possibility of installing both daytime and nighttime sights.

For example, U.S. Pat. No. 4,822,994 discloses a configuration in which the front end of a telescopic sight is separable from the rest of the sight. For nighttime use an image-intensifier module is inserted between the sections. However, for daytime operation, the user must disassemble the sight and remove and store the image-intensifier module.

One disadvantage to having separate daytime and nighttime sights is that the sights must be individually boresighted to the weapon whenever the sight is initially installed, and must be checked for boresight whenever the sight is reinstalled on the weapon. Current use of weapon sights by law enforcement and military personnel and by civilian users involves the careful mounting and boresighting of a day and/or night vision sight to the weapon. For maximum accuracy, actual firing of the weapon is required during the boresighting process. This is not generally feasible under combat conditions. Separate weapon sights are also disadvantageous because the sights must be interchanged for day or night use. In addition, the separate night vision sight adds an additional three to four pounds, which must be carried and handled separately by the user.

On the other hand, it is understood that the lenses of the objective lens unit and of the ocular lens unit may form a conventional optical daytime sight, which comprises a conventional telescopic tube with adjustable magnification. It is obvious that such daytime conventional telescopic sight can be combined with a night vision device such as IIT to form a self-contained device, and a great variety of optical sight systems which can at the same time be used both in daytime and nighttime merely by switching and without disconnection have recently appeared on the market and became a subject of new patents.

For example, U.S. Pat. No. 5,084,780 issued in 1992 to E. Phillips and U.S. Pat. No. 5,946,132 issued to the same inventor in 1999 disclose a telescopic sight that can be used for either nighttime or daytime operation and is particularly adaptable for use on weapons ranging from rifles to anti-tank weapons. A first embodiment includes a single objective and two parallel light paths, one for day viewing and one for night viewing. The objective forms the beginning of the night path. Separating dichroic mirrors transmit light from the objective along the night path and reflect light from the objective to the day path. The night path includes an IIT. A mirror at the end of the night path reflects the light from the IIT to a beamsplitter/combiner on the day path. The beamsplitter/combiner transmits the light from the day path and reflects the light from the night path along the same path to an ocular assembly for viewing. A second embodiment of the telescopic sight is similar to the first embodiment but contains two objective lens assemblies for collecting light, one for the night path and one for the day path. Because the sight has two separate objective lens assemblies, separating mirrors are not included. A third embodiment includes a projected aiming reticle and a direct view capability for day viewing which replaces one of the objective lens assemblies. The direct view channel includes a beamsplitter/combiner.

Furthermore, both patents of Phillips describe various methods for introducing an image of a reticle to the combined day and night optical path.

In spite of all advantages of the aforementioned optical sight system, it utilizes two parallel optical paths always used simultaneously irrespective of nighttime or daytime application. It is obvious that the use of two separate optical paths at the same time makes the sight optics large and heavy, which is a significant drawback for weapons, which are manually carried by the user.

The device based on the same principle of simultaneous and constant use of daytime and nighttime optical paths is disclosed in another U.S. Pat. No. 5,902,996 issued in 1999 to K. Sauter. This device is provided with two rotating mirrors, which can be rotated simultaneously for opening or closing the night vision system. Although this system is more reliable than the previous one, in general it entails the same disadvantages since it does not suggest any other new solutions of the problems inherent in the sight with two parallel and simultaneously working optical paths.

The above problem is solved by the system described in U.S. Pat. No. 6,131,294 issued in 2000 to U. Jibiki. This device comprises a telescopic sight with a small, separate night-vision block insertable into the daytime optical path between the ocular lens and the objective lens. A special recess is formed in the sight housing for fitting the insertable block into this recess with alignment of the optical path of the night-vision insert with that of the daytime sight portion. Insertion is carried out without the use of any special instruments or fasteners.

Although the U.S. Pat. No. 6,131,294 solves the problems of the earlier described devices by providing a single-path day/night vision optics, it is still possesses a number of significant disadvantages, which are the following.

Disconnection of the night-vision device, such as the image intensifier, exposes two optical surfaces on the opposite sides of the recess. During the use of the sight in the daytime mode these optical surfaces remain unprotected. Penetration of scattered day light into the aforementioned recess contributes to decrease in contrast of the image. Furthermore, the night-vision device, such as an image intensifier tube, is a very delicate optical instrument, which requires accurate handling after replacement. Therefore the use of the device of U.S. Pat. No. 6,131,294 is unsuitable for combat field conditions.

When the night-vision insert has a temperature different from the temperature of the stationary part of the sight, insertion of the night-vision block may cause fogging of the sight optics, which can make the sight inoperative for a substantial period of time.

Another problem associated with the use of the insertable night-vision block consists in that each insertion and removal requires readjustment of the optical system for refocusing.

U.S. Pat. No. 4,961,278 issued in 1990 to Ch. Johnson, et al., describes a sight apparatus for selective daytime and nighttime use due to provision of a rotating housing located between the ocular and objective of the telescopic sight assembly. This housing contains an image-intensifier unit for nighttime use and a lens coupling assembly for daytime use which are rigidly attached to opposite arms of a two-arm lever so that rotation of this level by about 180° will alternatingly align the optical axis of the sight either with the image-intensifier unit or with the daytime lens coupling assembly which is placed in the optical path of the sight. A disadvantage of this device consists in that in addition to an image-intensifier unit it requires the use of an auxiliary daytime coupling assembly, both of which must be attached to opposite arms of a pivotable lever. The use of the auxiliary daytime coupling contributes to an increase in the weight of the sight. Furthermore, as the coupling assembly and the image intensifier have diametrically opposite positions and the lever that supports these units has to be rotated by 180° in order to have enough room for such rotation the sight should have increased overall dimensions. Moreover, switching between the daytime optics and nighttime optics requires manual focusing and magnification with the use of a focusing and magnification mechanism. Another disadvantage of the design described in the aforementioned patent is that switching between the daytime use and the nighttime use requires rotation of the aforementioned lever with the entire housing and with switchable optics respective to the sight housing. This means that the housing of the sight consists of two separate parts, one of which is rotatingly installed on the other. Another essential disadvantage of the sight disclosed by the aforementioned patent consists of the arrangement of rotatable optics for rotation in a plane perpendicular to the optical axis of the sight. Such an arrangement contributes to an additional and significant increase in the sight dimensions because for efficient operation the image intensifier requires a high aperture ratio and this, in turn, requires the use of electrooptics of large diameter. This leads to an increase in the vertical dimension of the sight.

The problems of the above patent are solved in a self-contained day/night optical sight disclosed in U.S. Pat. No. 6,608,298 issued in 2003 to Leonid Gaber, who is an applicant of the present patent application. The apparatus is comprised of a telescopic sight assembly unit having a pivotable housing section located between the ocular and objective of the telescopic sight assembly. The aforementioned housing section contains an image intensifier tube for nighttime use and a mechanism coupled to the aforementioned housing section for pivoting it between a first and second positions indicative of a daytime and a nighttime mode, whereby when installed in the second position, the image intensifier tube is aligned with the optical axis of the telescope to provide nighttime operation and where it is installed in the first position, the image intensifier tube is removed from the optical axis to provide daytime operation.

A disadvantage of such an apparatus is that it is self-contained with the built-in image intensifier tube. This means that the image intensifier tube cannot be separated and removed from the sight, e.g., for replacement with another image intensifier tube or an optical device of another type. In other words, when a telescopic part or IIT requires maintenance or replacement, the entire apparatus has to be replaced.

Nevertheless, all day/night sights for weapons described above and those known to the applicant, including those that contain removable IIT's or IIT's switchable between the operative and inoperative positions, have complicated and relatively expensive construction and significant weight and are not universal in the sense that in the majority of cases they are bound to weapons of specific models.

For the solution of the problems inherent in the prior art technique, Tactic Solutions, LLC of Nevada, USA has developed a universal IIT known as Model PVS-14 Series Monoloc on the Leupold M1 Long Range Optics attachable to the rear side of a tubular sight optics so that the image intensifier tube is located between the viewer's eye and the ocular of the tubular sight (see http:monoloc.com/main.php?id_page=72).

In spite of the fact that this device is not of the type permanently installed together with the tubular optics and is not switchable between operative and inoperative positions, it is advantageous in that it is extremely light in weight, small in size, and, most importantly, quickly and easily attachable to rifle scopes of many models of military and hunting rifles, digital cameras, camcorders, Close Quarters Battle (COB) optics, and laser rangefinders, or spotting scopes, for night and reduced-ambient lighting conditions.

Although these advantages to some extent compensate for the necessity of frequent attaching/detaching operations, a serious disadvantage of the universal IIT of the above type is that it must be installed between the viewer eye and the ocular of the tubular optics, and this changes the eye-relief distance. Eye relief is the distance from the observer's cornea to the nearest optical surface of the eyepiece; this is the distance at which the entire (or largest) field of view is visible. In other words, the IIT attached to the rear end of the conventional tubular optics significantly shortens the eye-relief distance to the extent that in some cases the recoil at the moment of shooting hits the user between the eyes. In order to eliminate this problem, the user has to move the eye further away from the IIT's ocular, and in this case he/she cannot see the entire field of observation, and shooting conditions become inconvenient. This is shown in FIGS. 1 and 2, where FIG. 1 is a view of a conventional daytime tubular optical sight 20 with the eye relief H1 that corresponds to use of the sight 20 without an IIT, and FIG. 2 is a view of the tubular optical sight 20 with the eye relief H2 that corresponds to use of the sight 20 when the IIT 22 is attached to the rear end of the optical sight 20. Reference numeral 24 designates a viewer's eye. It can be seen that with the IIT 22 attached to the optical sight 20, the eye relief H2 becomes significantly shorter than the eye relief H1 required for normal shooting. Therefore, the user has to move the weapon forward and cannot have normal conditions under which the weapon can rest on the user's shoulder.

The problems experienced by a shooter in using a rearwardly attached night scope are well described By Craig Boddington in his articles at http://www.gunsandammomag.com/gun_columns/relief_1021/.

SUMMARY OF THE INVENTION

It is an object of the invention to provide a day/night weapon sight with eye relief that remains unchanged when the weapon is equipped with an image intensifier tube for shooting at nighttime. Another object of the invention is to provide the weapon sight of the aforementioned type where the image intensifier tube can be constantly maintained on the weapon and switched between the inoperative position in which it is offset from the optical axis of the sight and the operative position in which is it located behind the conventional tubular optical sight without changing the eye relief. It is still another object to provide the weapon sight of the aforementioned type that allows replacement of the IIT with attachment of another type, e.g., flashlight, camcorder, etc.

The day/night weapon sight of the invention consists of a conventional tubular optics installed on a weapon, e.g., a rifle, for use at daytime and an additional attachment device, e.g., an image intensifier tube. The daytime tubular optical sight is attached to a sliding plate that is guided on a receiver rail that is rigidly attached to the rifle. With the use of a pivotal linking mechanism, the sliding plate supports an attachment, e.g., an IIT, which in the inoperative position of the IIT holds it above the daytime tubular optics with the optical axis of the IIT parallel to the optical axis of the tubular optics. In order to install the IIT into the operative position required for use thereof at nighttime, the IIT is raised above the tubular optics by means of the aforementioned pivotal linking mechanism and is shifted with the use of the same pivotal linking mechanism in a plane-parallel motion to a position behind the tubular optics where optical axes of both devices coincide. With a slight forward movement, which is allowed by the aforementioned pivotal linking mechanism, the IIT is coupled to the end of the tubular optics. Since attachment of the IIT to the rear end of the tubular optics shortens the eye relief, the sliding plate that supports the assembly of the tubular optics with IIT is guided forward along the receiver rail to a position where the rear end of the IIT assumes the same position relative to the viewer's eye as the tubular optics with the IIT in the inoperative position. The device of the invention may be embodied in two variants. In the first embodiment, the IIT is switched to the operative position with rotation thereof in the raised position by 180° and with subsequent parallel-plane movement to the operative position. In this case, the IIT is held in its inoperative position with the chained objective cap facing in the forward direction and shifted away from the viewer's eyes during aiming and shooting. In the second embodiment, the installation to the operative position is carried out without rotation and with the same orientation of the IIT in both positions.

BRIEF DESCRIPTION OF THE DRAWINGS

FIGS. 3A-3F illustrate different positions of the image intensifier tube in the optical sight according to the first embodiment of the invention with rotation of the image intensifier tube by 180°.

DETAILED DESCRIPTION OF THE INVENTION

Figure 1:
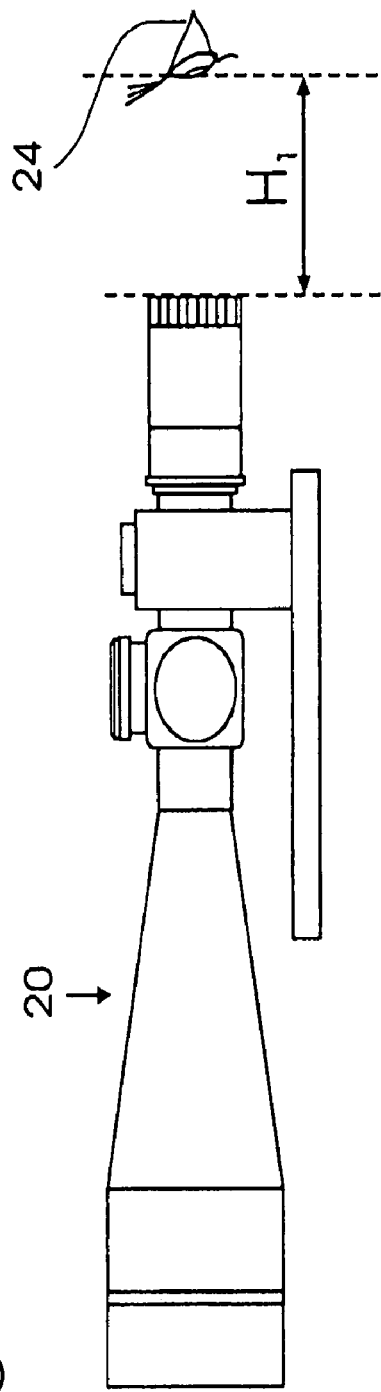
FIG. 1 is a general side view of a conventional tubular optical sight for daytime shooting.
Figure 2:
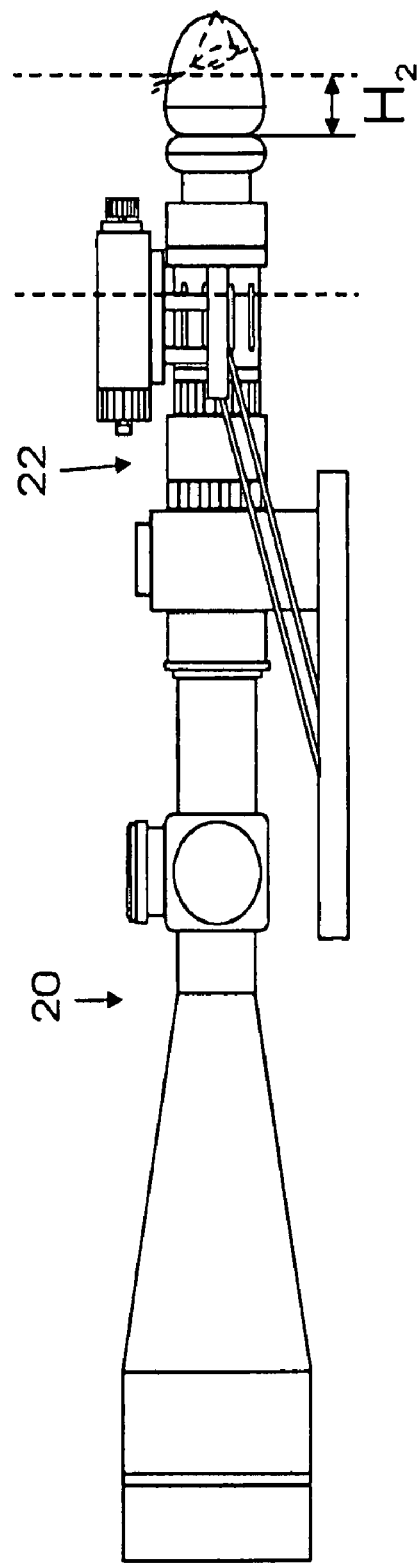
FIG. 2 is a view similar to FIG. 1 that illustrates shortening of the eye relief after attachment of an image intensifier tube to the rear end of the tubular optical sight.
Figure 3A:
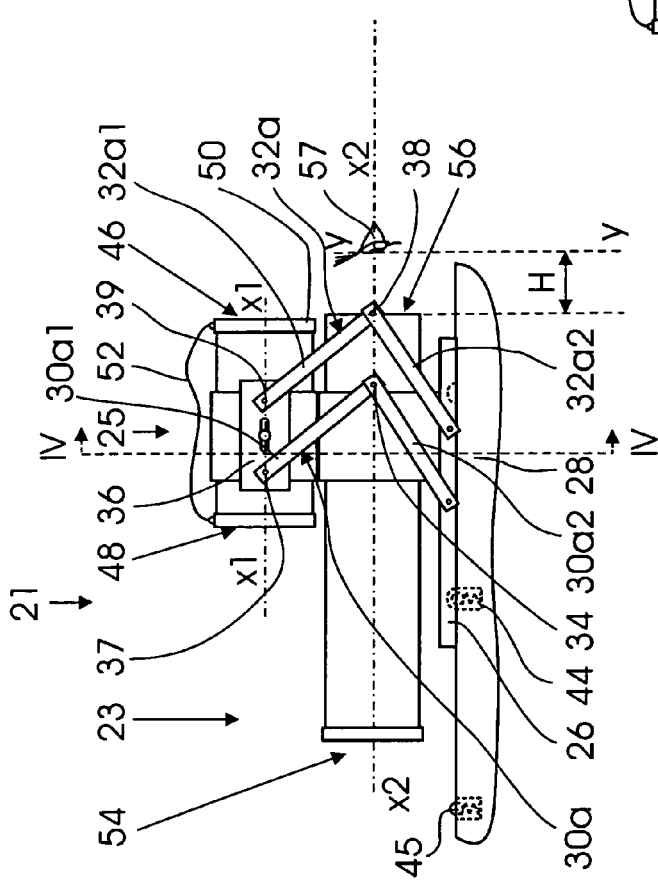

FIG. 3A is a schematic side view of the optical sight assembly of the invention which, as a whole, is designated by reference numeral 21. The optical sight assembly 21 consists of a conventional optical sight tube 23 for daytime use and an image intensifier tube (IIT) 25. In the context of the present invention, the term "image intensifier tube" covers any other optical sight device, such as a spotting scope or the like. In FIG. 3A, the image intensifier tube 25 is shown in the inoperative position above the optical sight tube 23 with the optical axis X1-X1 of the IIT 25 arranged parallel to the optical axis X2-X2 of the optical sight tube 23. As can be seen in FIG. 3A, the optical sight tube 23 is attached to a sliding plate 26 that is guided on a receiver rail 28 that is rigidly attached to the rifle (not shown). The IIT 25 is supported by the sliding plate 26 with the use of a pair of double-member linking mechanisms 30a and 32a. It is understood that a pair of similar linking mechanisms is located on the opposite side of the assembly and is not seen in FIG. 3A. The first linking mechanism 30a consists of two linking members 30a1 and 30a2, which are pivotally connected to each other by a pivot axle 34. The end of the linking member 30a1, which is opposite to the pivot axle 34, is pivotally connected by a pin 37 to a plate 36, which is connected to the IIT 25 via a pin and slot mechanism formed by a pin 41a (FIG. 3B), which is attached to the body of the IIT 25, and a guide slot 41b formed in the plate 36 for slidingly guiding the pin 41a. Similarly, the second linking mechanism 32a consists of two linking members 32a1 and 32a2, which are pivotally interconnected by a pivot axle 38. The end of the linking member 32a1, which is opposite to the pivot axle 38, is pivotally connected by a pin 39 to a plate 36.

In all FIGS. 3A through 3F, the vertical line Y-Y that passes through the viewer's eye designates a conventional reference line, the distance from which to the rear end of the optical unit nearest to the viewer (i.e., of the optical sight tube 23 used at day time and of the IIT 23 used at nighttime) defines the eye relief H.

Figure 4:
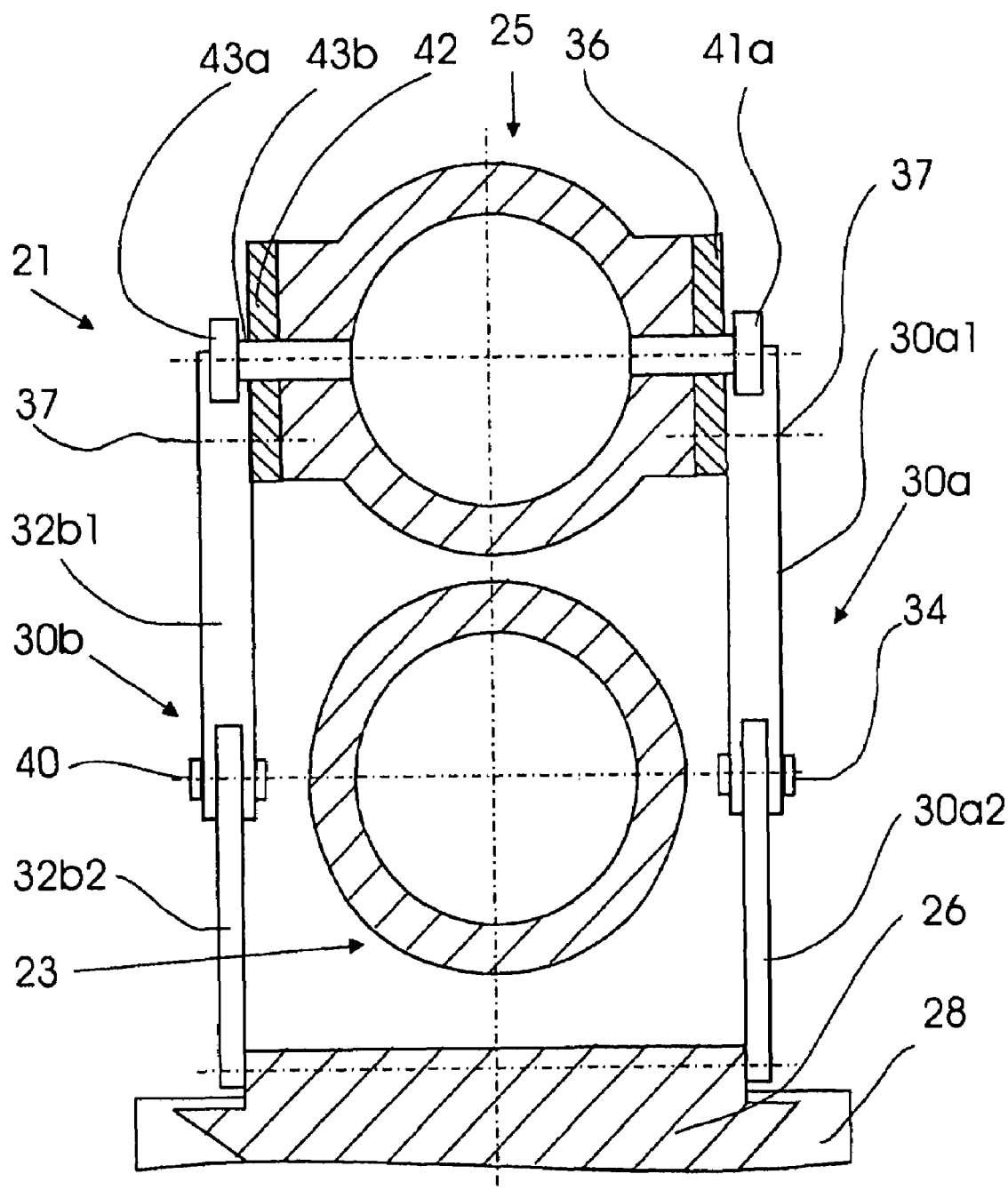
FIG. 4 is a sectional view along the line IV-IV in FIG. 3A

FIG. 4 is a cross-sectional view along the line IV-IV in FIG. 3A. It can be seen in this drawing that the ITT 25 of the optical sight assembly 21 is also supported by another pair of linking mechanisms 30b and by another similar mechanism which is not seen in the sectional view of FIG. 4. The linking mechanism 30b consists of two linking members 32b1 and 32b2, which are pivotally interconnected by a pivot axle 40. The end of the linking member 32b1, which is opposite to the pivot axle 40, is pivotally connected to a plate 42 via a pin and slot mechanism formed by a pin 43a (FIG. 4), which is attached to the body of the IIT 25, and a guide slot 43b in the plate 42 for slidingly guiding the pin 43. It is understood that linking mechanisms located on the opposite sides of the sight assembly 21 are identical and symmetrically arranged with respect to each other.

For locking the optical sight tube 23 with the IIT 25 in the inoperative position shown in FIG. 3A, the rail 28 may have a spring-loaded locking pin 44 that in the aforementioned position of the units snaps into a recess (not shown) provided on the mating surface of the sliding plate 26. For the purposes described below, the sliding plate is provided with another spring-loaded locking pin 45 spaced from the locking pin 44 in the target direction.

The IIT 25 has an objective side 46 and an ocular side 48. The objective side 46 may be closed by a protective cap 50 that is chained by a flexible member such as a thin chain 52 or otherwise attached to the body of the IIT 25. Similarly, the optical sight tube 23 also has an objective side 54 on the front end of the optical sight tube 23 that faces target and an ocular side 56 on the rear end of the optical sight tube 23 that faces the viewer's eye 57.

In the embodiment of the optical sight assembly 21 shown in FIGS. 3A-3F, in the inoperative position of the IIT 25 the objective side 46 of the IIT has its objective side 46 facing in the direction of a target. If in the inoperative position the IIT 25 were arranged in opposite orientation, i.e., with the objective side 46 facing the viewer's eye 57, the hanging portion of the flexible member 52 could get into the vision sight of the viewer during the use of the optical sight tube 23.

Figure 3B:
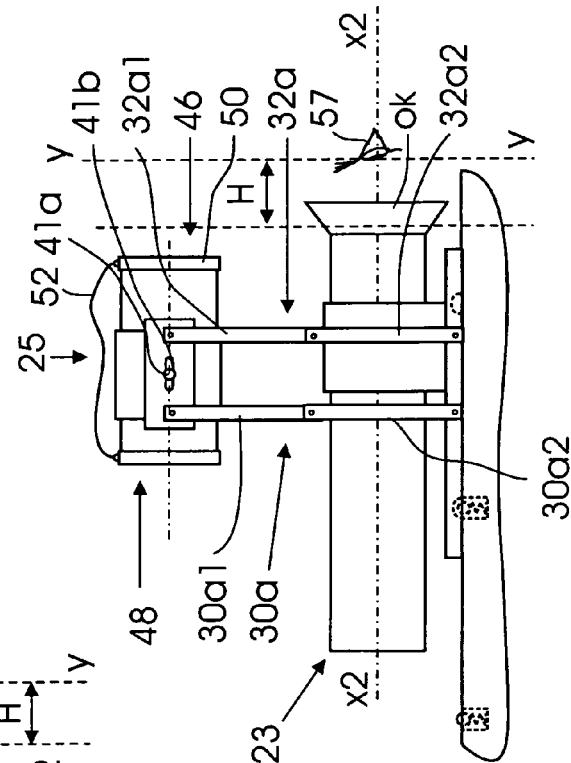

The following description with reference to FIG. 3B through FIG. 3E relates to switching of the IIT 23 to the operative position for using it at nighttime. First, as shown in FIG. 3B, the IIT 23 is raised above the optical sight tube 23 by straightening the linking mechanisms 30a, 32a, 30b, etc., so that their linking members 30a1, 30a2, 30b1, etc., are arranged along lines perpendicular to the optical axis X2-X2 of the optical sight tube 23 for raising the IIT 25 to the maximum distance from the optical sight tube 25, as shown in FIG. 3B. Since in this position the objective side 46 and the ocular side 48 of the IIT 25 assume positions opposite to those required for use of the IIT 25, the IIT has to be turned by 180°, which is now possible since the IIT 25 is raised above the optical sight tube 23 to a distance sufficient for unobstructed rotation.

FIG. 3C shows the IIT 25 in the stage of the aforementioned rotation around the pins 41a and 43a, if necessary, with sliding movement of the pins 41a and 43a in the respective guide slots 41b and 43b.

In FIG. 3D the IIT 25 is shown after rotation by 180° in the condition where the objective side 46 faces a target and the ocular side 48 faces in the opposite direction. The IIT is shown in the course of its plane-parallel motion in the direction of arrow by means of two pairs of the linking mechanisms 30a, 32a, etc. The optical axis X1-X1 of the IIT 25 is arranged parallel to the axis X2-X2 of the optical sight tube 25.

Figure 3E:
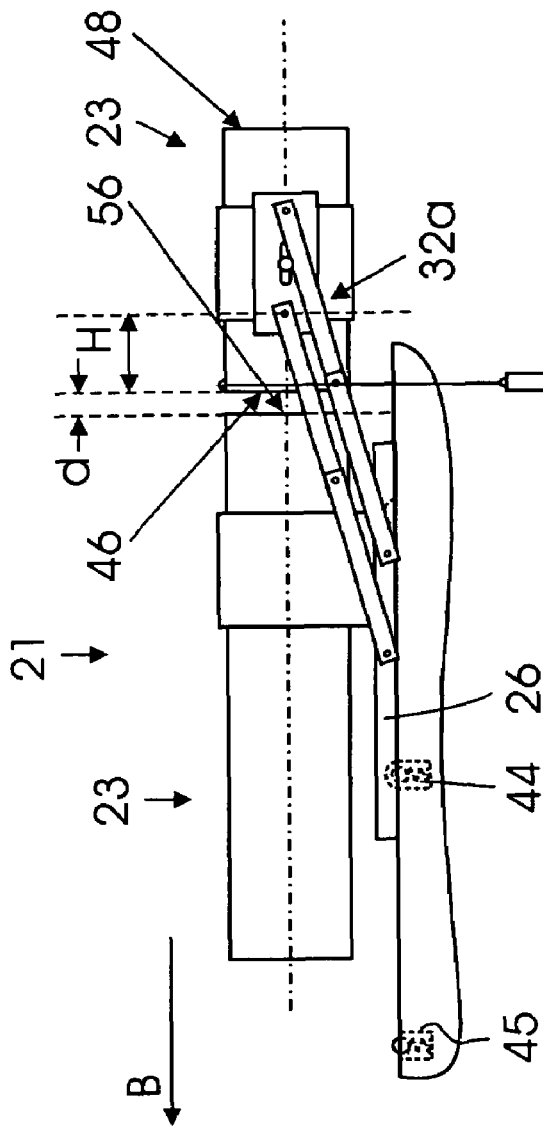

In FIG. 3E the IIT 23 is shown in a position directly behind the optical sight tube 23 with its optical axis X1-X1 aligned with the optical axis X2-X2 of the optical sight tube 23 and with the protective cap 50 removed and hanging down on the flexible member 52. It can be seen that the objective end 46 of the IIT 25 is spaced from the ocular end 56 of the optical sight tube 23 at a certain distance "d" that was required for unobstructed arrival of the IIT 25 to the position of alignment with the optical sight tube 23. It can be seen that in the axial direction the IIT 23 is still in a position that shortens or even overlaps the normal eye relief H1.

Figure 3F:
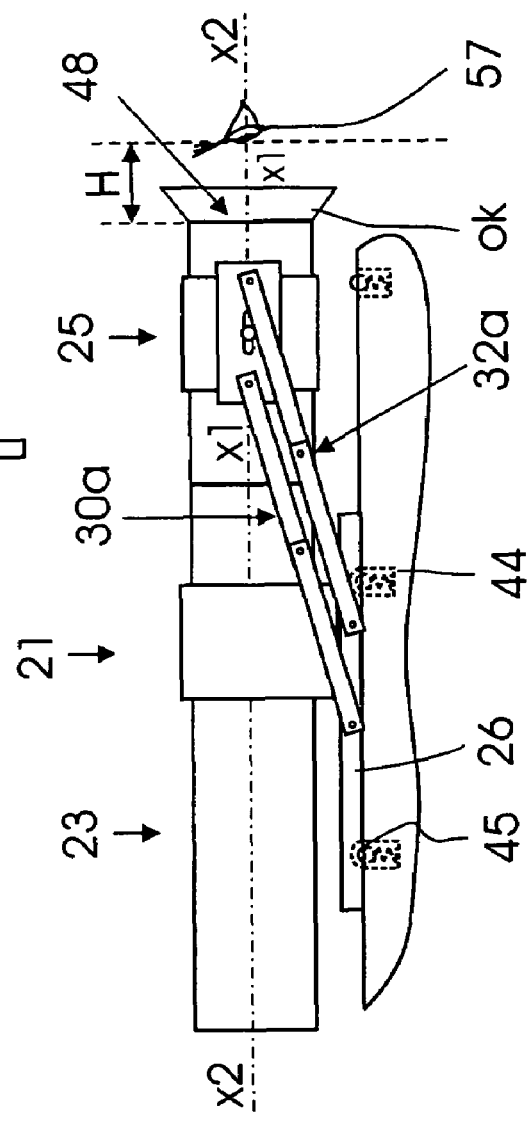

FIG. 3F shows the optical assembly 31 in the normal position for use at nighttime. In other words, the optical sight tube 23 is coupled to the IIT 25, and the entire assembly of both optical units 23 and 25 is shifted forward in the axial direction to a position in which the rear end, i.e., the ocular end 48 of the IIT 25, is arranged from the viewer's eye 57 at a normal eye relief distance H which is the same as the one used during the optical sight tube 23 at daytime (FIG. 3A). Installation to the position of FIG. 3F is achieved by first moving the IIT 25 towards the optical sight tube 23 in the axial direction using the axial movement as one of the degrees of freedom provided by the two pairs of the plane-parallel motion mechanisms 30a, 32a, 30b, etc. After both units are coupled, the sliding plate 26 that supports the optical sight assembly 21 is shifted forward along the receiver rail 28 (FIGS. 4 and 3F) in the direction of arrow B in FIG. 3E, until the spring-loaded locking pin 45 snaps into the forward recess (not shown) of the sliding plate 26 and fixes the assembly in the position of FIG. 3F.

As shown in FIG. 3B and FIG. 3F, the optical sight assembly may be equipped with a removable eyepiece OK that is made from rubber or soft plastic and can be removably attached either to the ocular side 56 on the rear end of the optical-sight tube 23 or on the ocular side 48 of the IIT 23.

If necessary, in the inoperative position of IIT 23, the ocular side 48 may be oriented towards the viewer, so that the IIT can be shifted to the position of FIG. 3E via the same stages as have been described above but without rotation thereof by 180°.

Thus, it has been shown that the invention provides a day/night weapon sight with eye relief that remains unchanged when the weapon is equipped with an image intensifier tube for shooting at nighttime. The image intensifier tube can be constantly maintained on the weapon and switched between the inoperative position in which it is offset from the optical axis of the sight and the operative position in which it is located behind the conventional tubular optical sight without changing the eye relief. The weapon sight of the invention allows replacement of the IIT with attachment of another type, e.g., flashlight, camcorder, etc.

The invention has been shown and described with reference to specific embodiments, which should be construed only as examples and do not limit the scope of practical applications of the invention. Therefore any changes and modifications in technological processes, constructions, materials, shapes and their components are possible, provided these changes and modifications do not depart from the scope of the patent claims. For example, the mechanism that allows shifting of the sliding plate with the optical sight assembly to the position required to maintain constant eye relief is not necessarily a sliding plate in the rail guides, and the same movement can be performed with the use of a gear-and-rack mechanism. Plane-parallel motion of the IIT between the inoperative and operative positions also can be performed with the mechanism other than the plane-parallel motion mechanism, e.g., these can be two mutually perpendicular guides. Locking mechanisms for locking the sliding plate in terminal positions can be carried out by using locking pins, spring-loaded balls, or snapping devices of other types. The IIT can be replaced by a camcorder, optical monocular, etc. Although it was mentioned that the day/night optical sight assembly of the invention was installed on a weapon, it is understood that it can be attached to any other support that is stationary relative to the sliding plate that supports both sight units.

The invention claimed is:

1. A day/night weapon sight assembly for use on a weapon without change in eye relief comprising: an optical sight support for supporting a day/night weapon sight on an object stationary with respect to said optical sight support; an optical sight tube for use at daytime rigidly supported by said optical sight support, said optical sight tube having an objective end that during use of the optical sight tube faces a target and an ocular end that faces a viewer eye, said optical sight tube having an optical axis and a predetermined eye relief during use; an image intensifier tube for use at nighttime which is supported by said optical sight support moveably with respect to said optical sight tube, said image intensifier tube having an objective end that during use of the optical sight tube faces a target and an ocular end that faces the viewer eye, said image intensifier tube having an optical axis and having an inoperative position where said optical axis thereof is not in alignment with said optical axis of said optical sight tube and an operative position where said image intensifier tube is installed between the viewer eye and said ocular end of said optical sight tube; and a shifting mechanism that allows displacement of said optical sight support in the direction away from the viewer eye when said image intensifier tube is installed by said switching mechanism in said operative position without changing said eye relief.

2. The day/night weapon sight assembly of claim 1, wherein said object stationary with respect to said optical sight support is a weapon and wherein said optical sight support for supporting the day/night weapon sight is a sliding plate moveably supported by said weapon for moving said day/night optical sight in the direction of said optical axis.

3. The day/night weapon sight assembly of claim 2, wherein in said inoperative position said image intensifier tube is located above said optical sight tube with the optical axis of said image intensifier tube arranged parallel to the optical axis of said optical sight tube.

4. The day/night weapon sight assembly of claim 3, wherein said switching mechanism is a plane-parallel motion mechanism for moving shifting said image intensifier tube between said inoperative position and said operative position with a plane-parallel motion.

5. The day/night weapon sight assembly of claim 4, wherein said plane-parallel motion mechanism comprises: a pair of plates between which said image intensifier tube is pivotally supported by a pair of coaxial pivotal axles that are rigidly attached to opposite lateral sides of said intensifier tube, said plates having longitudinal slots that slidingly guide said coaxial pivotal axles, respectively, so that said image intensifier tube can rotate around said coaxial pivotal axles and can be shifted on said coaxial pivotal axles in the direction of said longitudinal slots; and two pairs of double-member linking mechanisms arranged on both sides of said image intensifier tube, each said double-member linking mechanism comprising a pair of links having one ends pivotally connected to each other and opposite ends pivotally connected to said plates and to said optical sight support, respectively.

6. The day/night weapon sight assembly of claim 3, further comprising a protective cap for installation on said objective end of the said image intensifier tube attached on a flexible member to said image intensifier tube and a removable eyepiece installable on said ocular end of said image intensifier tube and said ocular end of said optical sight tube.

7. The day/night weapon sight assembly of claim 3, further comprising a first locking mechanism for locking said optical sight support on said weapon in a position for use of said optical sight tube with said predetermined eye relief and with said image intensifier tube in said inoperative position and a second locking mechanism for locking said optical sight support after switching said image intensifier tube to said operative position without changing said predetermined eye relief.

8. The day/night weapon sight assembly of claim 7, wherein said switching mechanism is a plane-parallel motion mechanism for moving shifting said image intensifier tube between said inoperative position and said operative position with a plane-parallel motion.

9. The day/night weapon sight assembly of claim 8, wherein said plane-parallel motion mechanism comprises: a pair of plates between which said image intensifier tube is pivotally supported by a pair of coaxial pivotal axles that are rigidly attached to opposite lateral sides of said intensifier tube, said plates having longitudinal slots that slidingly guide said coaxial pivotal axles, respectively, so that said image intensifier tube can rotate around said coaxial pivotal axles and can be shifted on said coaxial pivotal axles in the direction of said longitudinal slots; and two pairs of double-member linking mechanisms arranged on both sides of said image intensifier tube, each said double-member linking mechanism comprising a pair of links having one ends pivotally connected to each other and opposite ends pivotally connected to said plates and to said optical sight support, respectively.

10. The day/night weapon sight assembly of claim 9, further comprising a protective cap for installation on said objective end of the said image intensifier tube attached on a flexible member to said image intensifier tube and a removable eyepiece installable on said ocular end of said image intensifier tube and said ocular end of said optical sight tube.

11. The day/night weapon sight assembly of claim 2, further comprising a first locking mechanism for locking said optical sight support on said weapon in a position for use of said optical sight tube with said predetermined eye relief and with said image intensifier tube in said inoperative position and a second locking mechanism for locking said optical sight support after switching said image intensifier tube to said operative position without changing said predetermined eye relief.

12. The day/night weapon sight assembly of claim 2, further comprising a first locking mechanism for locking said optical sight support on said weapon in a position for use of said optical sight tube with said predetermined eye relief and with said image intensifier tube in said inoperative position and a second locking mechanism for locking said optical sight support after switching said image intensifier tube to said operative position without changing said predetermined eye relief.

13. The day/night weapon sight assembly of claim 12, wherein said switching mechanism is a plane-parallel motion mechanism for moving shifting said image intensifier tube between said inoperative position and said operative position with a plane-parallel motion.

14. The day/night weapon sight assembly of claim 13, wherein said switching mechanism is a plane-parallel motion mechanism for moving shifting said image intensifier tube between said inoperative position and said operative position with a plane-parallel motion.

15. The day/night weapon sight assembly of claim 14, wherein said plane-parallel motion mechanism comprises: a pair of plates between which said image intensifier tube is pivotally supported by a pair of coaxial pivotal axles that are rigidly attached to opposite lateral sides of said intensifier tube, said plates having longitudinal slots that slidingly guide said coaxial pivotal axles, respectively, so that said image intensifier tube can rotate around said coaxial pivotal axles and can be shifted on said coaxial pivotal axles in the direction of said longitudinal slots; and two pairs of double-member linking mechanisms arranged on both sides of said image intensifier tube, each said double-member linking mechanism comprising a pair of links having one ends pivotally connected to each other and opposite ends pivotally connected to said plates and to said optical sight support, respectively.

16. The day/night weapon sight assembly of claim 13, further comprising a protective cap for installation on said objective end of the said image intensifier tube attached on a flexible member to said image intensifier tube and a removable eyepiece installable on said ocular end of said image intensifier tube and said ocular end of said optical sight tube.

17. The day/night weapon sight assembly of claim 1, further comprising a protective cap for installation on said objective end of the said image intensifier tube attached on a flexible member to said image intensifier tube and a removable eyepiece installable on said ocular end of said image intensifier tube and said ocular end of said optical sight tube.

* * * * *